FIG. 1
FIG. 2
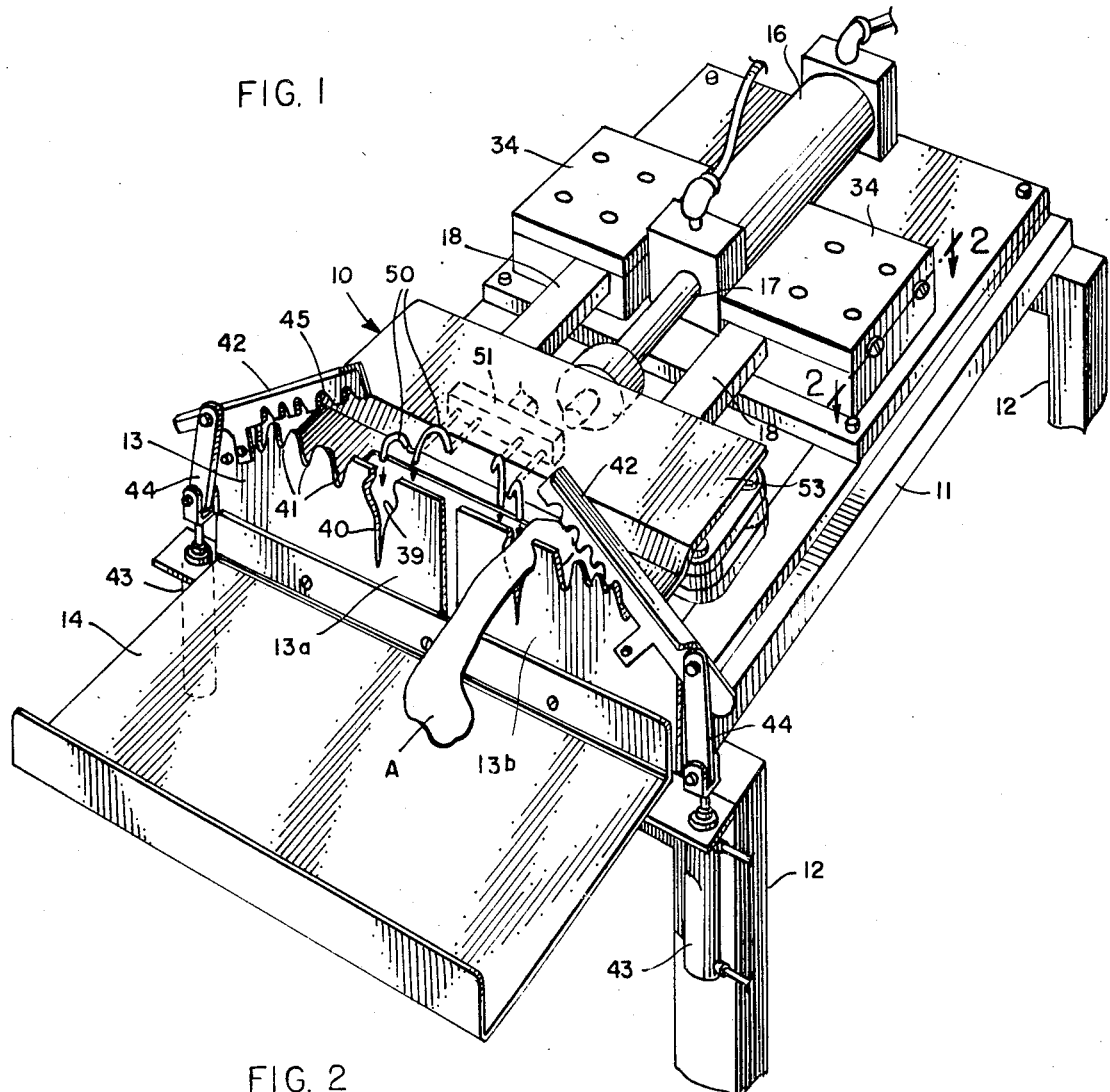
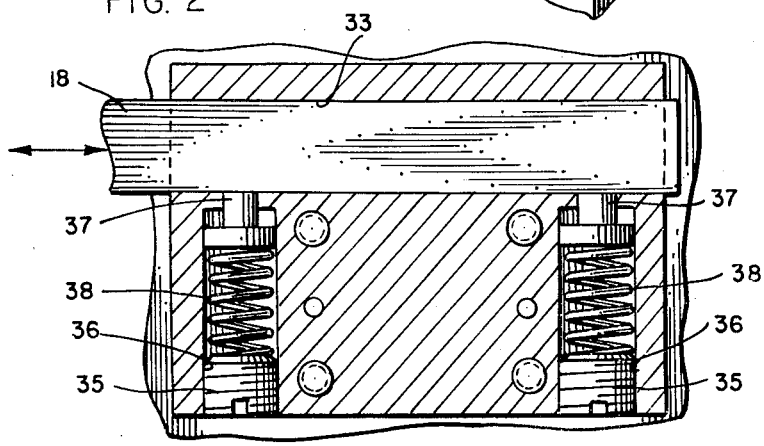
INVENTORS:
ASA B. SEGUR
RODNEY J. LINDGREN

May 12, 1970   A. B. SEGUR ET AL   3,510,908
APPARATUS FOR STRIPPING MEAT FROM SKELETAL COMPONENTS
Filed Sept. 6, 1967   3 Sheets-Sheet 2

INVENTORS:
ASA B. SEGUR
RODNEY J. LINDGREN
BY Dawson, Tilton, Fallon & Lungmus
ATT'YS

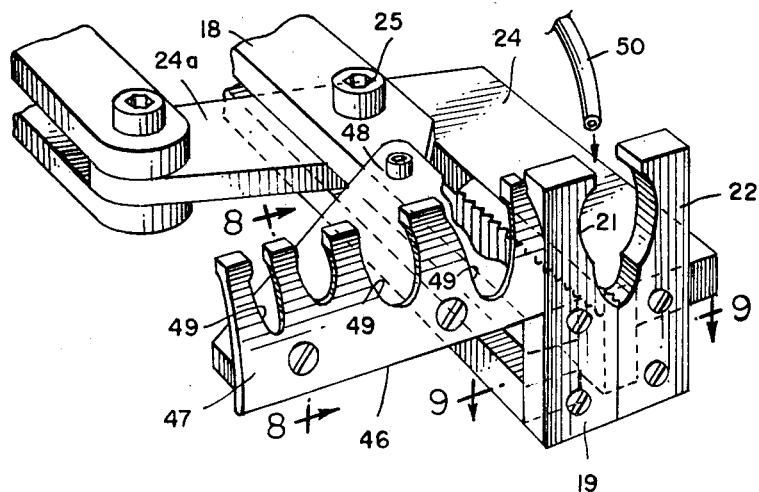
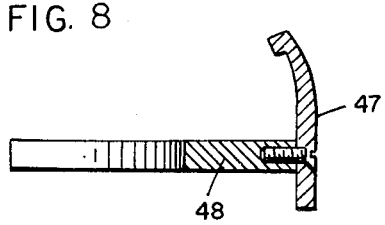
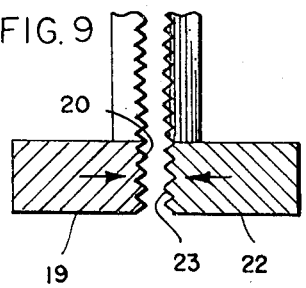
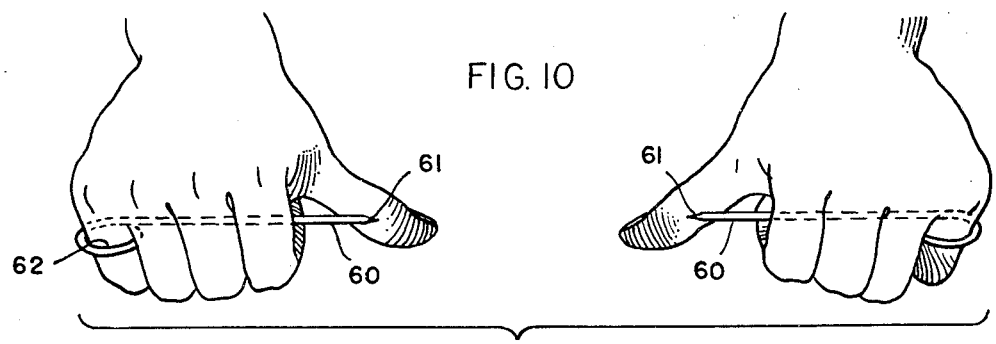

United States Patent Office 3,510,908
Patented May 12, 1970

3,510,908
APPARATUS FOR STRIPPING MEAT FROM SKELETAL COMPONENTS
Asa B. Segur, Oak Park, and Rodney J. Lindgren, Chicago, Ill., assignors to Asa B. Segur, doing business as A. B. Segur & Company, Oak Park, Ill.
Filed Sept. 6, 1967, Ser. No. 665,827
Int. Cl. A22c 21/00
U.S. Cl. 17—1                                                13 Claims

ABSTRACT OF THE DISCLOSURE

A device and method for stripping meat, particularly raw poultry meat, from a plurality of skeletal components at the same time. Such skeletal components are clamped by their ends between the jaws of a retractable carriage and are thereafter pulled through openings defined by a stationary plate and by closable gate elements. During initial portion of the piston stroke, the clamping jaws close tightly about the ends of the skeletal components, and during the remainder of the uninterrupted stroke the carriage draws away from the plate and gates to strip the meat from the bones or tendons.

BACKGROUND

Prior efforts have been made to develop satisfactory mechanical means for separating appendicular skeletal components, such as the leg bones and leg tendons of turkey carcasses, from the surrounding uncooked meat, but the products of such efforts have been largely unsatisfactory because of unreliable mechanical performance, incomplete meat-removal operation, mechanical complexity resulting in problems of maintenance and operation, and insufficient operating speed. Hence, in commercial meat-processing operations it is still a common practice to perform the steps of removing raw meat from the appendages almost entirely by hand.

In our co-pending application, Ser. No. 645,949, filed June 14, 1967, we disclose fixtures and methods for quickly and efficiently separating raw poultry meat from major skeletal components. To maintain the pace of operation developed through the use of such fixtures and methods, some means must be provided for quickly and reliably removing the raw meat from the appendicular skeletal components of such poultry carcasses.

SUMMARY

One aspect of the invention lies in providing an apparatus in which a single uninterrupted stroke of a piston results in a sequential double action of the carriage jaws which clampingly engage the skeletal components of a poultry carcass, the first action comprising a pivotal clamping step and the second action comprising a longitudinal translation and stripping step. The greater the resistance to longitudinal movement of the skeletal components, the greater is the clamping force automatically exerted on such components. The result is a positive and reliable operation which, in a single piston stroke, strips the bones or tendons away from the surrounding meat.

A single piston operates two sets of laterally-spaced clamping jaws so that an operator may use both hands simultaneously to insert bones or tendons between the sets of jaws. The parts are constructed and arranged so that automatic load equalization is achieved; thus, if a bone gripped by the jaws of one set is substantially larger in diameter than the bone gripped by the other set, the jaws will automatically adjust to clamp both bones with the same clamping force, or with the necessary force required to strip both bones from the surrounding meat as the piston retracts.

Throughout the specification, unless otherwise stated, the terms "skeletal components" and "bones" are used interchangeably to include not only true calcified bones but also other relatively stiff supporting or connecting elements such as tendons and ligaments. The invention is directed particularly to the removal of such elements from the uncooked meat of poultry appendages.

DRAWINGS

Figure 3:
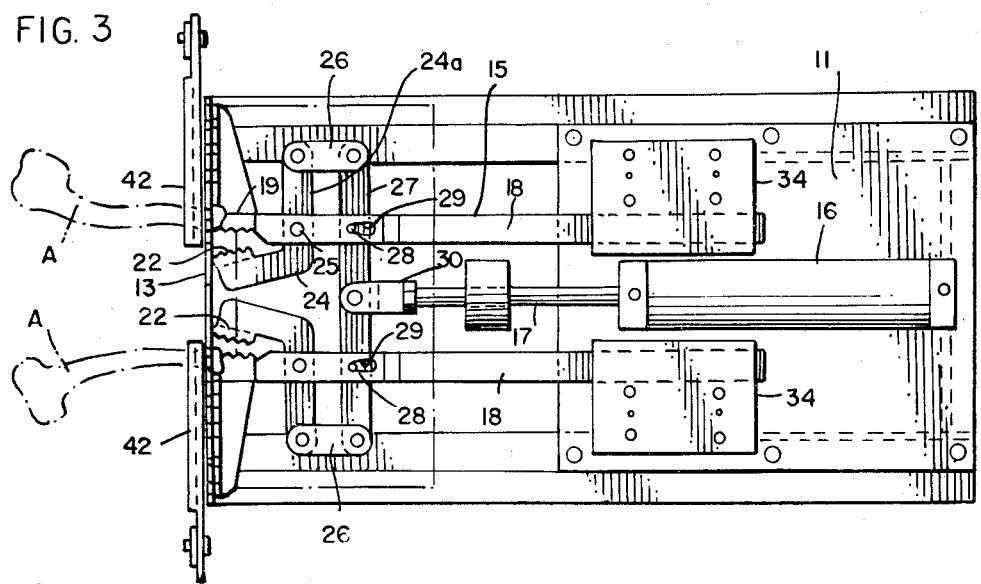
Figure 4:
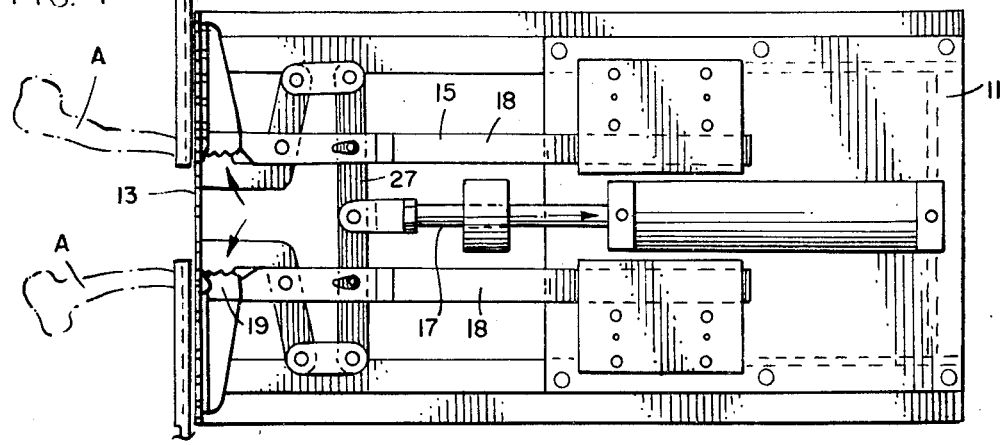
Figure 5:
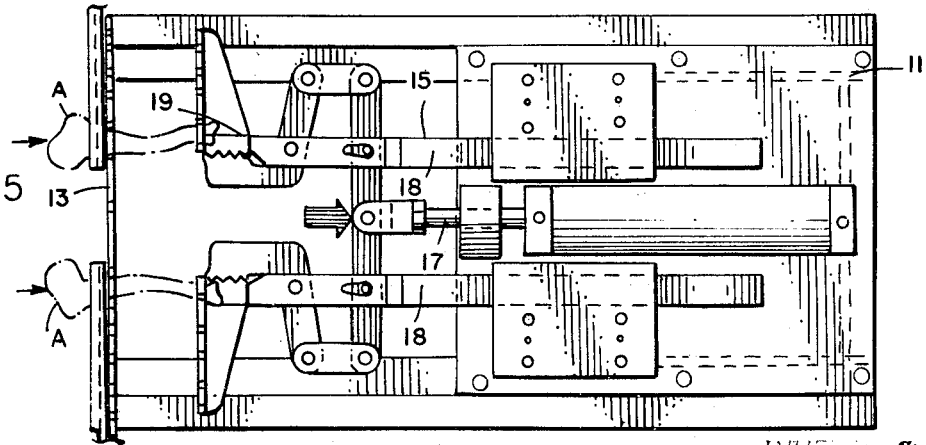
Figure 6:
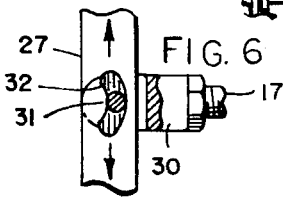

FIG. 1 is a perspective view of an apparatus embodying the present invention;
FIG. 2 is an enlarged fragmentary horizontal sectional view taken along line 2—2 of FIG. 1;
FIG. 3 is a top plan view showing an initial step in the operation of the apparatus;
FIG. 4 is a top plan view similar to FIG. 3 but showing the apparatus in a subsequent stage of operation;
FIG. 5 is a top plan view similar to FIGS. 3 and 4 but showing the parts during a final meat-stripping stage of operation;
FIG. 6 is an enlarged fragmentary plan view, partly in section, showing details of construction of the linkage between the piston and carriage;
FIG. 7 is an enlarged perspective view of one set of clamping jaws;
FIG. 8 is an enlarged vertical sectional view taken along line 8—8 of FIG. 7;
FIG. 9 is an enlarged horizontal sectional view taken along line 9—9 of FIG. 7;
FIG. 10 is a view showing positions of an operator's hands, and the pick elements held by an operator to assist in exposing the tendons and other skeletal components of a poultry appendage for the purpose of inserting the ends of such elements into the meat-stripping apparatus.

DESCRIPTION

Referring to the drawings, the numeral 10 generally designates an apparatus for stripping meat from the skeletal components of poultry carcasses. The apparatus includes a platform or frame 11 supported by legs 12. Extending across the platform near the front portion thereof is an upstanding plate assembly 13. A tray 14 may be mounted in front of the plate assembly 13 and constitutes a forward extension of platform 11.

Behind the upstanding plate assembly 13 is a retractable carriage assembly 15 illustrated most clearly in FIGS. 3–5. The carriage is slidable forwardly and rearwardly along platform 11. In the illustration given, the driving means for the carriage assembly comprises a double-action air cylinder 16 although it will be understood that other reversible driving means may be used. The cylinder is mounted upon the platform along the longitudinal midline thereof and has the front end of its forwardly extending piston 17 operatively connected to the carriage assembly.

Referring to FIGS. 3–5 and 7, it will be observed that the carriage assembly includes a pair of parallel and longitudinally-extending bars 18. Each bar has an inwardly facing jaw element 19 fixed to the front end thereof. Vertical ridges or teeth 20 extend along the inside surface of the lower portion of each jaw (FIG. 9), the upper portion of the jaw having an arcuate recess 21 along its inwardly-facing surface (FIG. 7). Since jaws 19 are rigidly secured to the front ends of bars 18 they may be regarded as "fixed" jaws even though the carriage assembly is capable of movement in its entirety.

A pair of movable jaws 22 are also carried at the front end portions of the bars 18 and, as best shown in FIG. 7, are substantially the mirror images of jaws 19. Jaws 22 are provided with outwardly facing vertical teeth 23 adapted to mesh with the teeth 20 of fixed jaws 19 when the respective jaws are brought together (FIG. 9). Each movable jaw 22 is carried at the forward end of a generally L-shaped arm 24, the laterally projecting portion 24a of arm 24 being pivotally connected to bar 18 by means of a pivot element 25. Thus, as the outermost end of arm portion 24a swings rearwardly and forwardly in a horizontal plane about the vertical pivot line passing through connector 25, jaw 22 moves into closed and open positions with respect to fixed jaw 19.

Links 26 pivotally connected the outermost end of each arm 24 with the outer ends of a transversely-extending load equilization bar 27 (FIG. 3). Upstanding pins 28 affixed to the load equalization bar project upwardly into longitudinal slots 29 of the respective carriage bars 18; therefore, while the load equalization bar is capable of forward and rearward movement relative to carriage bars 18, the extent of that movement is limited by the length of slots 29. When the pins 28 are disposed at the forward ends of the slots, the paired jaws 22 are in the open positions illustrated in FIG. 3, whereas when the pins are adjacent the rear ends of the slots the jaws are in the fully closed positions shown in FIG. 4.

The load equalization bar is centrally connected by clevis 30 to the front end of piston rod 17. Referring to FIG. 6, it will be noted that the vertical pin 31 of clevis 30 passes through an arcuate slot or opening 32 in the load equalization bar 27 so that the bar is capable of limited pivotal movement in a horizontal plane. The result is that even where the two sets of jaws clamp skeletal components of different size, the capacity of the load equalization bar to pivot about its connection with the clevis will produce substantial equalization of the clamping forces exerted by the respective sets of jaws. A smaller bone clamped between the jaws 19 and 22 of one set will be held by clamping forces of approximately the same magnitude as those applied to a larger bone simultaneously clamped between the jaws of the other set.

The rear end portions of carriage bars 18 are slidably received in the horizontal passages 33 of mounting block assemblies 34 secured to the platform 11. The ease with which the bars are capable of sliding through such assemblies may be selectively controlled by adjustment screws 35 threadedly received in bores 36 of each assembly (FIG. 2). It will be observed that bores 36 communicate with passage 33 and the friction elements 37 are disposed within bores 36 and bear against the side of carriage bar 18. Springs 38 are interposed between friction elements 37 and screw elements 35 and urge the friction elements into frictional contact with the carriage bars. The tension of such springs is selectively increased or decreased by threading screw elements 35 inwardly or outwardly.

Plate assembly 13 essentially comprises a pair of upstanding and transversely extending plates 13a and 13b. The two plates are arranged in side-by-side relation and, as shown in FIG. 1, are identically opposite—that is, are mirror images of each other. Each plate has an enlarged opening 39 extending downwardly from its top edge. The lower portion of each opening 39 extends downwardly in a gradually tapered V-shaped slit or notch portion 40. The openings 39 of the respective plates are arranged so that they align with the openings between the respective sets of jaws 19 and 22 directly therebehind.

Spaced laterally from the opening 39 of each plate are a plurality of smaller openings or recesses 41 extending downwardly from the upper edge of the plate (FIG. 1). The width, depth, and configuration of each of the openings 39 and 41 is developed and selected so that it will slidably accommodate at least the major portion of the length of a poultry bone but is too small to permit passage of the meat carried by that bone. Thus, openings 41 may be proportioned to receive smaller bones of the appendicular skelton of a poultry carcass such as, for example, the radius, ulna and humerus, whereas opening 39 is proportioned to receive larger bones such as, for example, the femur of the leg. The tapered slit or notch 40 is of a width sufficient only to receive bones of relatively small diameter, as well as tendons and ligaments.

In the illustration given, means are provided to restrain skeletal components against unintentional upward movement in openings 39 and 41 without at the same time preventing longitudinal movement of such components. The restraining means comprises a pair of gates 42 which are pivotally mounted upon plates 13a and 13b adjacent the outer limits thereof and which are capable of swinging between raised positions, permitting full access to openings 39 and 41, and lowered positions closing the upper ends of such openings. FIG. 1 illustrates the gates in intermediate positions of adjustment. It is believed apparent that the gates 42 pivot in the plane of plates 13a and 13b and that such gates may be shifted between their raised and lowered positions by air cylinders 43 and linkages 44 or by other suitable means. The lower edge of each elongated gate 42 is provided with notches or recesses 45 which complement openings 39 and 41 of each plate so that when each gate is fully lowered into its generally horizontal position the openings of the plate will combine with the openings of the gate to define generally circular openings which conform generally with the cross sectional configuration of the bones to be received therein. Consequently, the gates not only serve the function of restraining vertical movement of bones received within openings 39 and 41, but also performs a positive function in the stripping of meat from the upper surfaces of such bones, as will be described more fully hereinafter.

Referring now to FIG. 7, it will be observed that each "stationary" jaw 19 of the carriage is provided with a lateral extension 46 which includes a generally vertical and lateral bar 47 anchored to the jaw 19 and to bar 18 by means of a brace 48. Each lateral extension 47 has a plurality of upwardly opening recesses 49 which are aligned with recesses 41 of the stationary plate 13a directly in front of such extension. The width of each opening 49 is such that it will readily receive the intermediate portion of one or more specific appendicular poultry bones but is too narrow to permit sliding movement of the end of such bone therethrough. When the carriage is in its forward position, the front surface of each extension 47 is immediately behind an apertured plate of the plate assembly. As shown in FIG. 8, each extension, when viewed in vertical cross section, preferably curves upwardly and rearwardly so that the ends of bones received within recesses 49 will tend to be urged downwardly in such recesses as the carriage commences its rearward stroke.

Jet tubes 50 are mounted upon the apparatus so that an appropriate time during the cycle of operation of the unit (specifically, during the return movement of the carriage assembly) blasts of air may be directed at openings 39 and slits 40 to dislodge meat which might otherwise become trapped therein. A plurality of such jet tubes 50 are shown in FIG. 1 leading from a manifold 51 and it will be understood that similar tubes may be directed at openings 41 where such an arrangement is believed desirable. A typical jet tube 50 is somewhat diagrammatically illustrated in FIG. 7 to illustrate more clearly the relationship of such tube with respect to jaws 19 and 22. To prevent the possibility of meat (or possibly bones) from dropping downwardly onto and beneath the mechanism of the carriage assembly and the arrangement of tubes extending from manifold 51, a protective cover plate 53 may be mounted upon the platform directly behind plate assembly 13. Such cover is not illustrated in FIGS. 3–5, and the jet tube and manifold assembly is similarly omitted in those views, so that the carriage assembly and its operation may be viewed more clearly.

FIG. 10 illustrates a pair of tools 60 which have been found particularly useful in connection with the operation of the apparatus for the purpose of manually exposing the ends of small bones, tendons, and ligaments, as a preliminary step to the insertion of the end portions of such elements into the openings 39 and 41 and between jaws 19 and 22. Each tool consists of a metal rod approximately three to five inches in length having a sharpened tip 61. The opposite end of the rod is looped to from an eye or finger opening 62 large enough to receive the last finger of an operator's hand. The tools are held as shown in FIG. 10, one tool in each hand, so that the operator may use his thumbs to urge meat into contact with the pointed ends of the tools for the purpose of exposing the ends of tendons and other skeletal components.

OPERATION

It is believed evident from the foregoing that the apparatus may be used to strip meat from a poultry of bones at the same time, each of the openings 39 and 41 slidably receiving a bone which is then pulled rearwardly through such openings as the carriage assembly retracts. To simplify a detailed description of the operation of the mechanism, the stripping of meat from only a single bone will be described, it being understood that during normal use of the apparatus a trained operator will use both hands in feeding bones into both sides of the apparatus (i.e., into the openings of both plates 13a and 13b) at the same time.

FIG. 1 illustrates a relatively large appendicular bone A, such as the femur or tibia of a leg or the humerus of a wing, with its end portion received within an opening 39 of plate 13b. The bone is received in such opening simply by dropping its end portion downwardly through the open upper end of the recess, gate 42 being raised to permit such insertion. The enlarged end process of the bone is disposed rearwardly of opening 39 and of recess 21 in the "stationary" jaw 19 of the forwardly extended carriage assembly. Thereafter, upon manual actuation of a suitable air control device (not shown) gates 42 are lowered and piston 17 commences its rearward stroke.

FIG. 3 illustrates the gates 42 in lowered position immediately prior to the commencement of the rearward stroke of carriage piston 17. As the piston shifts rearwardly, load equalization bar 27 moves rearwardly relative to bars 18, thereby causing the movable jaws 24 to shift into closed positions (FIG. 4). The jaws therefore clamp shut about the bones A directly in front of their enlarged end processes. If the bone held by one set of jaws is substantially larger than a bone held by the other set, thereby preventing one set of jaws from completely closing, the smaller bone is nevertheless securely clamped because of the equalization of forces resulting from the pivotal mounting of the load equalization bar 27.

During the latter portion of the same rearward stroke of piston 17, with load equalization bar 27 now restrained against rearward movement relative to longitudinal bars 18 because both sets of jaws are fully closed, the entire carriage, including bars 18 and the paired jaws 19 and 22, shift rearwardly away from plate assembly 13. The bones A are pulled through the openings of the plate assembly. Because of the size relationship between such openings and the appendages from which meat is to be removed, the meat is blocked from rearward movement through such openings and is therefore stripped from the bones. The operator simply finishes the job of releasing the meat from the front ends of the bones after such bones have been drawn rearwardly through the openings and places such meat in a suitable receptacle. The piston 17 then commences its return forward stroke, the first portion of such stroke causing an opening of the jaws and the latter portion of the stroke returning the jaws and the longitudinal bars 18 into their starting positions.

Gates 42 are lifted as the carriage executes its return stroke so that the operator may remove and discard the cleaned bones.

Meat is removed from ligaments and tendons in the same manner as described above except that the ends of such elements are inserted into the V-shaped slits 40 after such ends have been exposed by an operator through the use of tools 60. As the piston 17 commences its rearward stroke, jaws 22 close with the toothed lower portions 23 of such jaws clamping securely upon the forward ends of the tendons or ligaments.

It is important during operation of the apparatus that the jaws securely clamp the ends of the skeletal components without exerting excessive forces which might cause such components to fracture. Adjustment of the clamping forces exerted by each set of jaws may be easily controlled by simply rotating adjustment screws 35 which control the frictional resistance applied to longitudinal bars 18. If the resistance to movement of such bars is relatively great, then the clamping force of the jaws will be substantial before movement of the entire carriage assembly commences. On the other hand, if the resistance to movement of bars 18 is relatively slight, then the clamping force will also be slight. The clamping force exerted by the jaws is therefore directly related to the resistance to movement of slide bars 18. Such bars, and the jaws supported thereby, commence their rearward movement only when the resistance to further closing of the jaws is greater than the resistance to rearward movement of such bars. For the same reason, the jaws of each set open as the piston 17 commences its forward stroke since the force necessary to open such jaws is substantially less than the force necessary to slide bars 18 forwardly.

While in the foregoing we have disclosed the structure and method of the invention in considerable detail for purposes of illustration, it will be understood that many of these details may be varied without departing from the spirit and scope of the invention.

What is claimed is:

1. In an apparatus for use in stripping meat from appendicular skeletal components of poultry carcasses; a frame; an upstanding plate mounted upon said frame and having at least one recess extending downwardly from an upper edge portion thereof, said recess being dimensioned to permit a skeletal component of a poultry carcass to slide therethrough while said plate restrains movement of the meat about said component; and power means mounted upon said frame behind said plate for pulling a skeletal component through said recess for the stripping of meat therefrom by said plate, said power means including an upstanding member disposed behind said plate and movable forwardly towards said plate and rearwardly away therefrom, said member having a recess extending downwardly from an upper edge thereof and disposed directly behind the recess of said plate, the recess of said member being wider than the intermediate portion of an elongated skeletal component from which meat is to be stripped but narrower than the rear end of said component, whereby, the end portion of such skeletal component may be gripped within the recess of said member so that as said member is shifted rearwardly behind said plate said component is drawn through the plate recess to strip the meat therefrom, and means for shifting said member forwardly and rearwardly with respect to said plate.

2. The structure of claim 1 in which a gate member is mounted for vertical movement between a lowered position extending along the upper edge portion of said plate and a raised position disposed away from the upper edge portion of said plate.

3. The structure of claim 2 in which said gate member is provided with a downwardly facing recess complementing the recess of said plate when said gate member is lowered, said recesses of said plate and said lowered gate member defining a circumferentially completed opening through which the skeletal component of a poultry carcass may be drawn by said power means.

4. The structure of claim 1 in which said recess includes a downwardly-extending tapered slit portion through which tendons, ligaments, and small bones of a poultry carcass are slidably receivable.

5. The structure of claim 1 in which said power means comprises a carriage assembly including a pair of clamping jaws movable towards and away from said plate along a path of travel aligned with said recess, and means for moving said jaws along said path of travel and for opening and closing said jaws.

6. In an apparatus for use in stripping meat from appendicular skeletal components of poultry carcasses, a frame, an upstanding plate mounted upon said frame and having at least one recess extending downwardly from an upper edge portion thereof, said recess being dimensioned to permit a skeletal component of a poultry carcass to slide therethrough while said plate restrains movement of the meat about said component, and power means mounted upon said frame behind said plate for pulling a skeletal component through said recess for the stripping of meat therefrom by said plate, said power means comprising a carriage assembly including a pair of clamping jaws movable towards and away from said plate along a path of travel aligned with said recess, and means for moving said jaws along said path of travel and for opening and closing said jaws, said carriage assembly also including a slide bar mounted for sliding movement upon said frame along said path of travel, said last-mentioned means comprising a fluid cylinder and piston mounted upon said frame, one of said jaws of said pair of clamping jaws being fixed to one end of said bar and the other of said jaws being mounted at one end of an arm pivotally connected to said bar, the opposite end of said arm being operatively connected to the piston of said fluid cylinder for movement of said pivotally-mounted jaw into closed position with respect to said fixed jaw when said piston is moved away from said plate, and into open position when said piston is moved towards said plate.

7. The structure of claim 6 in which the stroke of said piston exceeds the distance of movement in the same direction of the opposite end of said arm when said pivotally-mounted jaw is moved from its open position to its closed position, whereby, movement of said piston away from said plate first causes said pivotally-mounted jaw to close and then causes said slide bar and said pair of jaws to move away from said plate.

8. The structure of claim 7 in which friction means is provided for selectively adjusting the resistance to sliding movement of said slide bar and for thereby selectively controlling the clamping force exerted by said jaws.

9. The structure of claim 7 in which said plate is provided with a second recess spaced laterally from said first recess and said carriage assembly includes a second pair of jaws, arm, and slide member comprising the mirror images of said first-mentioned jaws, arm, and slide member and being disposed behind said second-mentioned recess of said plate, said first and second slide bar being disposed in spaced parallel relation with respect to each other, said first and second arms having their opposite ends pivotally joined by a transverse load-equalization bar, said transverse load-equalization bar being pivotally connected at an intermediate point to said piston, whereby, as said piston moves away from said plate, both said first and second pair of jaws are closed and, thereafter, said first and second slide bars are retracted to draw said first and second pairs of closed jaws away from the recesses of said plate.

10. The structure of claim 1 in which said member extends upwardly and rearwardly adjacent the recess thereof, whereby, the end of a skeletal component gripped within said recess will tend to be urged downwardly therein as said member is shifted rearwardly.

11. In an apparatus for use in stripping meat from appendicular skeletal components of poultry carcasses; a frame; an upstanding plate mounted upon said frame and having at least one recess extending downwardly from an upper edge portion thereof, said recess being dimensioned to permit a skeletal component of a poultry carcass to slide therethrough while said plate restrains movement of the meat about said component; an upstanding member disposed behind said plate having a recess extending downwardly from an upper edge thereof and disposed directly behind the recess of said plate, the recess of said member being wider than the intermediate portion of an elongated skeletal component from which meat is to be stripped but narrower than the rear end of said component; and power means mounted upon said frame for urging said plate and said member apart; whereby, the end portion of a skeletal component may be gripped within the recess of said member so that as said plate and said member are shifted apart said component has the meat stripped therefrom by said recessed plate.

12. The structure of claim 11 in which a gate member is mounted for vertical movement between a lowered position extending along the upper edge portion of said plate and a raised position disposed away from the upper edge portion of said plate.

13. The structure of claim 12 in which said gate member is provided with a downwardly facing recess complementing the recess of said plate when said gate member is lowered, said recesses of said plate and said lowered gate member defining a circumferentially completed opening through which the skeletal component of a poultry carcass may be slidably received.

References Cited

UNITED STATES PATENTS

| | | |
|---|---|---|
| 2,851,362 | 9/1958 | Goldberg. |
| 2,857,619 | 10/1958 | Massengill. |
| 2,893,051 | 6/1959 | Massengill. |
| 3,216,056 | 11/1965 | Segur _____ 17—1 |
| 3,296,653 | 1/1967 | Segur _____ 17—11 |

LUCIE H. LAUDENSLAGER, Primary Examiner

U.S. Cl. X.R.

17—1, 46